Feb. 20, 1951 — L. A. WILKIN — 2,542,444
LIQUID STORAGE TANK AND SEAL MECHANISM
Filed Jan. 29, 1948 — 2 Sheets-Sheet 2
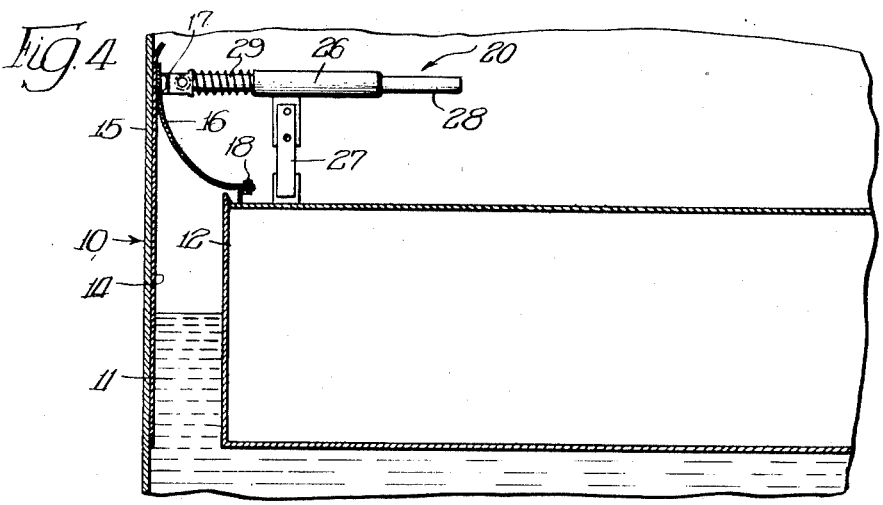
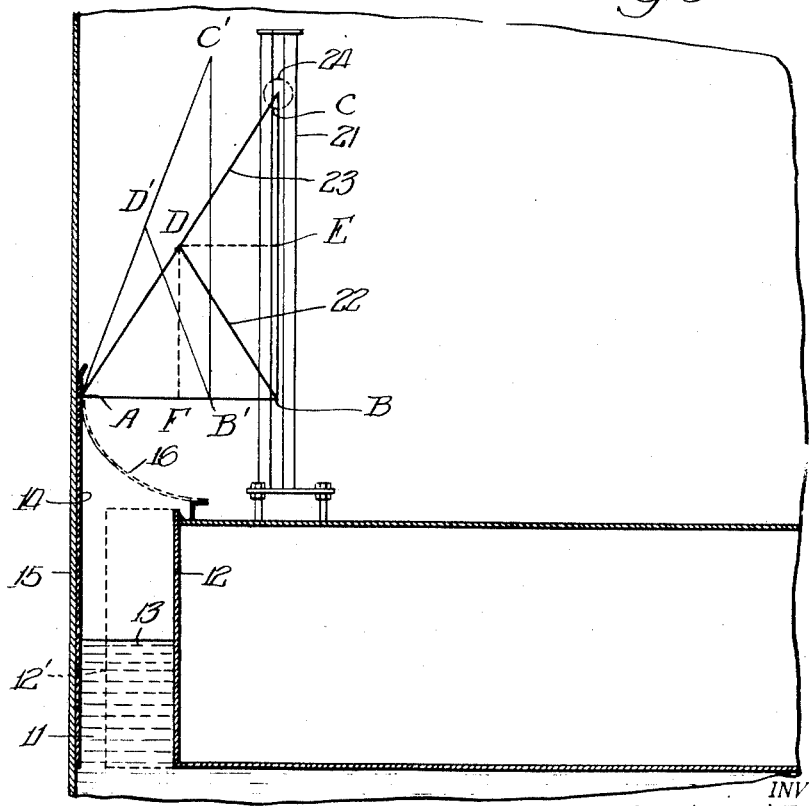
INVENTOR.
Lester A. Wilkin,
BY F. D. Prager Patented Feb. 20, 1951

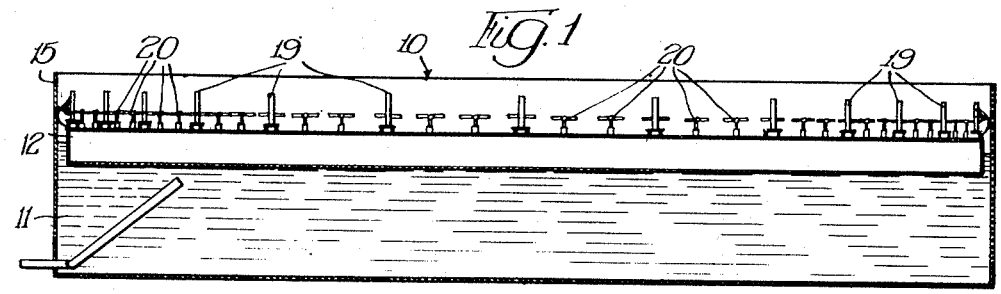
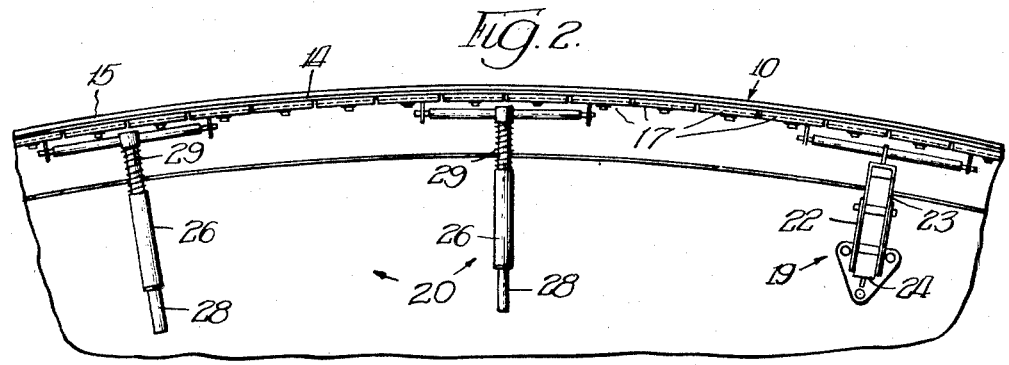
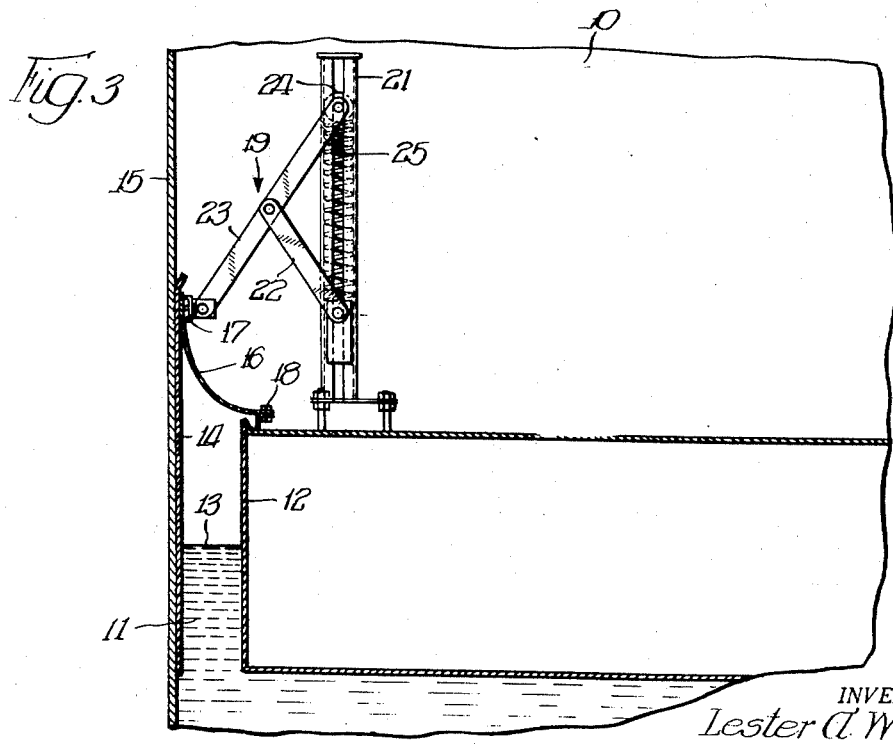
INVENTOR.
Lester A. Wilkin,
BY
F. D. Prager
ATTY.

2,542,444

UNITED STATES PATENT OFFICE 2,542,444

LIQUID STORAGE TANK AND SEAL MECHANISM

Lester Anderson Wilkin, East Chicago, Ill., assignor to Graver Tank & Mfg. Co., Inc., a corporation of Delaware Application January 29, 1948, Serial No. 5,012

4 Claims. (Cl. 220—26)

This invention relates to storage tanks for volatile liquids such as petroleum, gasoline and the like. The invention relates particularly to so-called floating roofs for such tanks, and to improved peripheral seals for such floating roofs.

The improvement resides in the fact that the seals according to this invention have a plurality of important and advantageous features, constituting a more efficient and economical combination than previously known. Each of the seals previously known and used had some of these features, but none had all of them. The most important features of the seals and their accessories, according to this invention, are that they insure efficient and economical sealing action between the floating roofs and the tank; they are allowed and forced to stay close to the tank shell; they have predetermined, substantially horizontal movements relative to the floating roof; they are efficiently and economically protected from corrosion; they are readily accessible for inspection and maintenance; they occupy a minimum of space; their entire construction and arrangement is economical and dependable; and they are freely adaptable to a great variety of floating roofs, for different types of volatile liquids. Details of these and other features will be stated in the description which follows.

In the drawing, Fig. 1 shows a tank and floating roof equipped with improved seal mechanisms according to this invention; the structure being shown in central, vertical section through the tank. Fig. 2 is a partial plan view of the structure shown in Fig. 1. Fig. 3 is an enlarged detail from Fig. 1, showing important parts of the seal mechanisms. Fig. 4 shows another detail, the view being taken in the direction indicated by the lines 4—4 in Fig. 2. Fig. 5 is a geometrical diagram of the device according to Fig. 3.

I provide a storage tank 10 for the volatile liquid or so-called product 11. A floating roof 12 rests on the surface 13 of said product; it is somewhat smaller than the tank, so that a narrow peripheral space is left around the floating roof 12. It is pertinent to state that tanks and roofs as contemplated herein generally range from about 20 ft. to about 200 ft. in diameter and from about 30 to about 50 ft. in height. The peripheral space around the floating roof is made as narrow as possible, generally about 6 inches in width, in order to minimize the bulk and cost of the sealing mechanism required to prevent the loss of valuable vapors.

In the embodiment of Fig. 1 the sealing apparatus comprises a substantially cylindrical seal ring 14, contacting the inside of the side wall or shell 15 of the tank 10 in the approximate region opposite the floating roof 12, and extending from above to below the liquid level 13. A seal fabric 16 connects an upper part of the seal ring 14 with an upper part of the floating roof 12; the seal fabric being clamped to said upper parts by suitable clamping devices 17 and 18 respectively.

The seal ring 14 can be made from corrosion-resistant metals such as galvanized or stainless steel or aluminum and the seal fabric 16 from a flexible, vapor-tight and water-tight material such as rubberized cloth, glass fibre, asbestos or the like. In tanks as contemplated herein a metal seal ring 14 is preferably made from a plurality of metal seal shoes 14—A, 14—B etc., combined into a ring by suitable joints (not shown). The reason for such a plurality of shoes is that shipment and installation would be difficult if the seal ring consisted of fewer and proportionally longer shoes, or of a single shoe; this is true even with relatively small tanks having a diameter such as 30 or 40 ft.

The joints as well as the seal shoes themselves must have sufficient flexibility to insure intimate contact between the inside of the shell 15 and the outside of the seal ring 14, in order to keep the escape of vapors at an absolute minimum, while allowing substantially unobstructed upward and downward travel of the roof and seal. Such travel must be allowed in spite of unavoidable irregularities of the tank shell 15, horizontal movements of the roof 12, the effect of wind, rain, snow, ice, sunshine, heat, and various other influences. At the same time, the seal ring 14 must have sufficient rigidity to allow support thereof from widely spaced points on the floating roof 12, in the interest of economy; it being understood that generally, each shoe must be supported from at least one supporting mechanism 19, and that these mechanisms are important cost elements. Such rigidity is also required because otherwise the seal ring could be distorted and damaged, upon vertical movements thereof along a shell 15 with ice adhering thereto and in other contingencies which are hard to avoid.

A substantially cylindrical metal seal ring 14 fulfills each of these conflicting requirements of flexibility and rigidity to a sufficient degree, if the metal of the seal shoes is properly selected. The preferred metal thickness for such a shoe is in the approximate range of $\frac{1}{32}$ to $\frac{1}{8}$ inch; the actual selection depending on the type of metal used, the diameter of the tank and roof, and other factors. Flexibility is mainly required in a horizontal plane while rigidity is mainly required along the vertical, cylindrical surface of the shoe. With metal thicknesses as specified these aims are generally achieved. Again, a metal shoe of such thickness can have considerable length between its joints or ends; thereby allowing considerable spacing between the points of support. This spacing of supports, with one support per shoe, can be in the approximate range of 10 to 15 ft. along the periphery of the tank or floating roof.

The seal supporting means additionally serves to guide the seal, keeping all relative movements between the seal ring and the floating roof in a horizontal plane. I have found such horizontal movements to be desirable for a number of reasons, particularly because non-horizontal movements between these parts tend to produce local distortion of the seal ring, imperfect sealing contact with the shell, and difficulties with the seal loading mechanisms.

It is known that such a seal ring may tend to move inwardly away from the tank shell, at some points, if it is not urged outwardly against the shell at closely spaced points; specifically, at points which are spaced not more than about 3 to 5 feet from one another if the seal ring is constructed and dimensioned as indicated above. Again, there is some obvious conflict present, since the permissible spacing of seal supports exceeds that of the positions for outward loading of the seal. However, the conflict is eliminated by the preferred form of my invention, which provides seal supporting means 19, peripherally spaced about 10 to 15 feet, and intermediate seal loading or pusher means 20 to urge the seal ring towards the shell, peripherally spaced about 3 to 5 feet.

Moreover my improved seal supporting and guiding mechanism 19 may serve as additional seal loading means. The reverse, however, does not apply; I have found it is much more expensive to adapt pusher members 20 to serve as seal guiding and supporting means.

I show each of the shoes 14—A etc. suspended from the floating roof 12 by one supporting and guiding means or hanger mechanism, generally designated by the numeral 19. Each of these hanger mechanisms comprises a roller track 21, vertically upstanding from the top of the floating roof 12; a swinging linkage member 22, pivoted to a lower part of the roller track and extending upwardly and outwardly therefrom; and a connecting linkage member 23, having one end pivoted to an upper part of a seal shoe such as 14—A, the other end equipped with a roller 24 on roller track 21, and an intermediate point pivoted to the free end of the swinging linkage member 22. In this manner the linkage members form a toggle 22, 23, the movements of which are controlled by the track 21, floating roof 12 and shell 15.

The upstanding roller tracks 21 can be installed close to the peripheral edge of the floating roof 12; it being desirable for the linkage member 23 to be as short as possible and to form a rather acute angle—definitely less than 45 degrees—with the roller track, in order to prevent binding of the roller 24 and other difficulties. Thus the room occupied by the mechanisms 19, radially of the tank, is insignificant, facilitating access to all parts of the roof and seal. The mechanisms 19 will generally be about 3 ft. high, whereby they are readily accessible for inspection and maintenance.

The linkage members 22 and 23 are rigid, and the roller 24 is forced to move in a straight line along the track 21. Thus the outer end of the connecting link 23 is also forced to move in a straight line relative to the floating roof.

In order to keep this line horizontal I make the connecting linkage member 23 twice as long as the swinging linkage member 22, I pivot the two linkage members together in the middle of the connecting linkage member 23, and I install the track 21 perpendicularly to the floating roof 12; said roof, of course, being horizontally supported by and upon the horizontal liquid level 13. Upon reference to Fig. 5 it will be understood that the end points of the linkage members 22 and 23 form the corners of a triangle ABC. The joint between the two linkage members is point D. Thus I have two isosceles triangles ABD and BDC, having side BD and vertex D in common; sides AD and DC forming a straight line ADC. The important point is that, regardless of the angle BAC which obviously can vary, ABC always is a right angle. Accordingly side AB always is horizontal, side BC being vertical.

The proof of the proposition that ABC is a right angle is readily found upon construction of auxiliary lines DE and DF through vertex D, perpendicular respectively to bases BC and AB. Since ABD is an isosceles triangle the line DF, being perpendicular to the base by construction, bisects the vertex angle ADB. Similarly the line DE bisects the vertex angle BDC. This is true regardless of the magnitude of each of said angles. The two vertex angles total 180 degrees since ADC is a straight line. Accordingly the angle FDE between the two bisectors DF and DE is a right angle. The quadrangle FDEB, then, has right angles at F and E by construction, and at D according to the above. Thus the fourth angle FBE or ABC must be a right angle also, as was to be shown.

In other words, if the float roof changes its position on the liquid level 13, for instance if the wind forces it from position 12 to 12¹, shifting point B to B¹, linkage member 23 can freely rotate around point A, shifting point C to C¹; no uncontrolled forces are applied to seal ring 14 incident to this process, either upwardly or downwardly, and undesirable distortion of the seal ring is avoided. It is safely avoided even in the event that the ring, with clamping member 17 for fabric 16, has considerable flexibility in order to adapt itself to the tank wall 15 irrespective of local obstructions.

The seal guide and hanger 19 can be adapted to urge the seal ring 14 towards the shell 15, by means of a loading device shown in form of a tension spring 25. This spring has one end attached to the axle of the roller 24 and the other end attached to a lower part of the roller track 21. In position 12¹, when some parts of the floating roof are closer to the tank shell 15 than at 12, roller 24 is forced into position C¹, above the original position C, thereby extending the spring 25. Since linkage member 23, rotates around point A, associated with clamp 17, slightly inwards from the body of the seal ring, that component of the downward spring tension force which is not absorbed by the track 21 and float roof 12 (through roller 24 and linkage member 22) is transmitted to the seal ring 14 by linkage member 23 and clamp 17. At this clamp, the force so transmitted is dissolved into two components; one tending to bend the top of the seal ring inwards (this must be resisted by that amount of rigidity that is provided in the seal ring, as previously mentioned); and another, tending to press the seal ring against the side wall 15.

The magnitude of the spring force, and thus the magnitude of the forces transmitted to the seal ring, increases as the floating roof approaches the side wall; however the last-mentioned component, horizontally directed against the side wall, decreases due to the increasing angle BAC. In some instances the spring 25 can be so selected, according to mechanical principles known to persons skilled in the art, that the decrease of the horizontal component at A more or less compensates for the increase in total magnitude of the spring force. From a practical standpoint, the ultimate effect of the spring force resides in the total horizontal force between the floating roof 12 and the stationary wall 15, at each point of the periphery, transmitted at points A, B and C. The angularity at BCA and other points, together with the downward force of spring 24, can be selected so that this total horizontal spreading force in each mechanism 19, is more or less uniform regardless of a slightly excentric position of the floating roof; or it can be selected so that it increases in a predetermined manner upon a lateral shift of the floating roof, thereby tending to keep the floating roof centered within the tank.

In this manner each of the seal shoes is suspended, horizontally guided and positively urged against the tank shell by at least one hanger, guide and loading device 19; the floating roof is yieldingly centered in the tank; and the seal ring is allowed to cling to the tank shell without distortion incident to required movements, and without undesirable loss of vapor through local gaps. The devices 19 are effectively protected from corrosion by the fabric 16; without this fabric, corrosive vapors would rapidly impair their action, at least in some instances. Of course the devices 19, preferably, are also protected from atmospheric corrosion, by galvanizing or the like.

As mentioned before, I also provide seal loading or pusher members, generally shown by numeral 20. Each of these pusher members comprises a horizontal pipe 26 rigidly secured to and spaced above the top of the floating roof 12 by a post 27, radially of the roof and tank; a pipe or bar 28 of smaller diameter inserted in and preferably extending through the pipe 26 and secured to the top of the seal shoe 14; a compression spring member 29 engaging an inner end of the pipe 26 and an outer end of the pipe 28 so as to push the latter and the seal against the tank shell; and conventional spring abutment means (not shown in detail) to provide this engagement. The pusher members 20 occupy some space, radially of the tank, but they are generally only about 1 ft. high so that they present no serious obstruction; the seal ring and the other mechanisms are still accessible without difficulty.

It will now be seen why the members 19 cannot be practically replaced by simple pusher members 20. The latter would be unable to perform the necessary guiding and suspending functions; the compression springs would be jammed between the pipes 26 and 28, and the device would become inoperative upon any upward or downward movement of the roof. It is true that certain forms of pusher members are known which are capable of performing several or all of these three functions. However such devices are much more complicated, expensive and cumbersome than the simple pusher members 20 hereof, or the combination of the latter with the members 19; they are harder of access and maintenance, and they make it much more difficult to provide necessary access to the seal shoes, fabric, and clamping devices.

Various modifications may occur to persons skilled in the art.

I claim:

1. In a storage tank for volatile liquid, a floating roof; a substantially cylindrical seal ring disposed around and spaced from the floating roof, contacting the wall of the tank and extending from above to below the liquid level; a seal fabric connecting an upper part of the seal ring with an upper part of the floating roof; hanger and guide mechanisms for the seal ring, distributed around the periphery of the floating roof, each of said mechanisms comprising a roller track, vertically upstanding from the top of the floating roof; a swinging linkage member, pivoted to a lower part of the roller track and extending upwardly and outwardly therefrom; and a connecting linkage member twice as long as the swinging linkage member, having one end pivoted to an upper part of the seal ring, the other end equipped with a roller, on the roller track, and the point in the center between said ends pivoted to the free end of the swinging linkage member.

2. Apparatus according to claim 1, additionally comprising loading means to urge the roller downwardly along the roller track and thereby to urge at least parts of the seal ring outwards.

3. Apparatus according to claim 2 wherein said additional means consists of a tension spring engaging the roller and a lower part of the roller track.

4. Apparatus according to claim 2 wherein the hanger and guide mechanisms and loading means are adapted to urge only spaced parts of the seal ring outwards; the apparatus additionally comprising pusher mechanisms distributed around the periphery of the floating roof, between the hanger and guide mechanisms, and adapted to urge intermediate parts of the seal ring outwards.

LESTER ANDERSON WILKIN.

REFERENCES CITED

The following references are of record in the file of this patent:

UNITED STATES PATENTS

| Number | Name | Date |
|---|---|---|
| Re. 22,169 | Hammeren | Sept. 1, 1942 |
| 2,148,811 | Griffin | Feb. 28, 1939 |
| 2,287,211 | Wiggins | June 23, 1942 |
| 2,313,856 | Wiggins | Mar. 16, 1943 |
| 2,388,163 | Laird | Oct. 30, 1945 |